United States Patent
Dudar et al.

(10) Patent No.: US 11,073,099 B2
(45) Date of Patent: Jul. 27, 2021

(54) SYSTEMS AND METHODS FOR EVAP LEAK TESTING

(71) Applicant: Ford Global Technologies, LLC, Dearborn, MI (US)

(72) Inventors: Aed M. Dudar, Canton, MI (US); Russell Randall Pearce, Ann Arbor, MI (US); Dennis Seung-Man Yang, Canton, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 16/386,180

(22) Filed: Apr. 16, 2019

(65) Prior Publication Data

US 2019/0242324 A1    Aug. 8, 2019

Related U.S. Application Data

(62) Division of application No. 15/187,307, filed on Jun. 20, 2016, now abandoned.

(51) Int. Cl.
*F02D 41/22* (2006.01)
*F02M 25/08* (2006.01)
*F02D 41/00* (2006.01)

(52) U.S. Cl.
CPC ........... *F02D 41/22* (2013.01); *F02D 41/004* (2013.01); *F02M 25/089* (2013.01); *F02M 25/0818* (2013.01); *F02M 25/0836* (2013.01); *F02D 2041/225* (2013.01); *Y02T 10/40* (2013.01)

(58) Field of Classification Search
CPC ... F02D 41/004; F02D 41/22; F02M 25/0818; F02M 25/0836
See application file for complete search history.

(56) References Cited

U.S. PATENT DOCUMENTS

| | | | |
|---|---|---|---|
| 6,763,298 B2 | 7/2004 | Boggs et al. | |
| 6,971,357 B2 * | 12/2005 | Grieser | F01N 3/30 |
| | | | 123/179.18 |
| 7,233,845 B2 | 6/2007 | Veinotte | |
| 7,562,559 B2 * | 7/2009 | Chung | B60W 10/08 |
| | | | 73/49.7 |
| 8,739,766 B2 | 6/2014 | Jentz et al. | |
| 9,429,114 B2 * | 8/2016 | Dudar | F02D 41/2406 |
| 9,458,801 B2 * | 10/2016 | Dudar | F02M 25/0809 |
| 9,644,556 B2 * | 5/2017 | Pursifull | F02D 19/061 |
| 9,677,512 B2 * | 6/2017 | Dudar | F02M 25/0809 |
| 9,739,244 B2 * | 8/2017 | Dudar | F02D 41/042 |
| 9,840,985 B2 * | 12/2017 | Martin | F02D 41/22 |
| 9,850,832 B2 | 12/2017 | Dudar | |
| 10,012,183 B2 | 7/2018 | Dudar | |
| 10,100,770 B2 * | 10/2018 | Dudar | F02D 35/02 |

(Continued)

*Primary Examiner* — John Fitzgerald
(74) *Attorney, Agent, or Firm* — Geoffrey Brumbaugh; McCoy Russell LLP

(57) ABSTRACT

Methods and systems are provided for regulating evaporative emissions from a fuel system. In one example, a method may comprise spinning an engine unfueled responsive to a hydrocarbon concentration at a fresh air end of a fuel vapor canister increasing above a first threshold. The method may comprise spinning the engine to pull hydrocarbons away until a hydrocarbon concentration at a purge end of the fuel vapor canister, opposite the fresh air end, increases above a second threshold.

20 Claims, 7 Drawing Sheets

(56) References Cited

U.S. PATENT DOCUMENTS

| | | | |
|---|---|---|---|
| 10,408,143 B2* | 9/2019 | Dudar | F01M 13/022 |
| 2013/0032127 A1* | 2/2013 | Jentz | F02M 25/0809 |
| | | | 123/520 |
| 2014/0330482 A1* | 11/2014 | Yang | F02M 25/0809 |
| | | | 701/34.4 |
| 2015/0085894 A1 | 3/2015 | Yang et al. | |
| 2015/0090233 A1 | 4/2015 | Dudar et al. | |
| 2015/0114089 A1* | 4/2015 | Dudar | F02M 25/0809 |
| | | | 73/40 |
| 2016/0177882 A1* | 6/2016 | Dudar | F02D 41/003 |
| | | | 701/22 |
| 2016/0319718 A1* | 11/2016 | Dudar | F01N 3/00 |
| 2017/0002761 A1* | 1/2017 | Dudar | F02D 35/02 |
| 2017/0082043 A1* | 3/2017 | Dudar | F02D 41/024 |
| 2017/0096974 A1* | 4/2017 | Dudar | B60W 20/00 |
| 2017/0114744 A1* | 4/2017 | Martin | F02D 41/22 |
| 2017/0204796 A1* | 7/2017 | Dudar | F02M 25/0836 |
| 2017/0363055 A1* | 12/2017 | Dudar | F02M 25/089 |

* cited by examiner

SYSTEMS AND METHODS FOR EVAP LEAK TESTING

CROSS REFERENCE TO RELATED APPLICATION

The present application is a divisional of U.S. Non-Provisional patent application Ser. No. 15/187,307, entitled "SYSTEMS AND METHODS FOR EVAP LEAK TESTING," and filed on Jun. 20, 2016. The entire contents of the above-referenced application are hereby incorporated by reference for all purposes.

BACKGROUND AND SUMMARY

Vehicle emission control (EVAP) systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using a vacuum pump positioned in the emission control system. In some vehicles, such as in plug-in hybrid electric vehicles, engine run time is limited and the vacuum pump may be required to perform leak detection. The vacuum pump may be included in an evaporative leak check module (ELCM) which draws vacuum across a reference orifice to obtain a reference vacuum to which evacuated fuel tank vacuum is compared.

However, when evacuating the EVAP system and/or fuel system during a leak test, the vacuum pump may pull hydrocarbons in the canister towards the pump. In some examples, hydrocarbons in the canister may escape to the atmosphere during a leak test due to the negative pressure applied by the vacuum pump. Some approaches aimed at reducing emissions during a leak test may include a reversible vacuum pump that may be operated in a first direction to evacuate the canister during a leak test, and then may be operated in an opposite second direction to push hydrocarbons deeper into the canister, and away from the atmosphere.

However, the inventors herein have recognized issues with such approaches. In one example, configuring the vacuum pump as a reversible pump may require additional electrical components, such as an H-bridge, which increase the cost of the EVAP system. Further, reversible pumps may operate at reduced efficiencies when run in reverse, thus leading to increased energy consumption when pushing fuel vapors deeper within the canister.

The above issues may be at least partially addressed by a method comprising, spinning an engine unfueled responsive to a hydrocarbon concentration at a fresh air end of a fuel vapor canister increasing above a first threshold, to pull hydrocarbons away from the fresh air end of the fuel vapor canister. The spinning the engine may be terminated when a hydrocarbon concentration at a purge end of the canister, opposite the fresh air end, increases above a second threshold. In this way, canister breakthrough of hydrocarbons may be reduced.

In another example, a method may comprise running a leak test for an evaporative emissions control (EVAP) system, and responsive to determining that hydrocarbon breakthrough from a vent side of a fuel vapor canister of the EVAP system is imminent: stopping the leak test, opening a canister purge valve to fluidically couple the canister to an intake of an engine, and spinning the engine without fuel.

In yet another example, a vehicle system may comprise an engine including one or more engine cylinders, an evaporative emissions control (EVAP) system including a fuel vapor canister, a fuel system including a fuel tank, an evaporative leak check module (ELCM) including a vacuum pump for detecting leaks of one or more of the EVAP system and fuel system, and a controller with computer readable instructions stored in non-transitory memory for redistributing hydrocarbons within the canister by spinning the engine unfueled in response to hydrocarbon levels at a fresh air end of the canister increasing above a threshold.

In this way, a vehicle may prevent and/or reduce hydrocarbon emissions from a fuel vapor canister by spinning the engine unfueled when breakthrough from the canister is imminent. Further, a cost of the EVAP system may be reduced by configuring the vacuum pump of the ELCM to be unidirectional and using the vacuum generated by the spinning engine to pull fuel vapors away from the fresh air end of the canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

This detailed description relates to systems and methods for managing evaporative emissions in a motor vehicle. In particular, this description relates to leak detection tests for an evaporative emissions system of a motor vehicle. The systems and methods may be applied to a hybrid vehicle, such as the hybrid vehicle schematically depicted in FIGS. 1A and 1B. An evaporative emissions control (EVAP) system, such as the example system shown in FIG. 2, may be included in the motor vehicle to regulate evaporative emissions, such as fuel vapor. The evaporative emissions system may include a canister for storing fuel vapors and an evaporative leak check module, comprising a vacuum pump and a valve, enabling leak testing of the fuel system and evaporative emissions system. The evaporative leak check module may be positioned between the canister and the atmosphere. An example method for determining when to run a leak test is described in FIG. 4. The evaporative leak check module may be operable in numerous configurations, such as the configurations shown in FIGS. 3A-3C. For example, during a leak test, the vacuum pump may be powered on and the valve of the leak check module may be adjusted between a first position and a second position. While the valve is in the second position, the vacuum pump may apply negative pressure to a fuel vapor canister and/or fuel tank, and thus gasses from the EVAP system and/or fuel system may be drawn out of the EVAP system and pushed to the atmosphere. Thus, during a leak test, the vacuum pump may push air and/or gasses from the EVAP system out to the atmosphere.

However, while evacuating gasses from the EVAP system to the atmosphere, the vacuum pump may also displace fuel vapors within the canister. In particular, fuel vapors in the canister may be pulled towards the vacuum pump and atmosphere to a fresh air end of the canister. In some examples during the leak test, the vacuum pump may generate sufficient vacuum to dislodge fuel vapors from the canister, and release the fuel vapors to the atmosphere, leading to increased emissions. However, as described in the example method of FIG. 5, the leak test may be temporarily paused or canceled when hydrocarbon breakthrough from the canister to the atmosphere is imminent. Subsequently, the engine may be spun, and vacuum generated by the spinning engine may be used to pull fuel vapors away from the fresh air end of the canister. Thus, fuel vapors within the canister may be pulled away from leak check module and atmosphere, and towards the engine. In this way, hydrocarbon emissions during a leak test may be reduced and/or prevented. An example timeline for such a method is shown in FIG. 6.

Figure 1A:
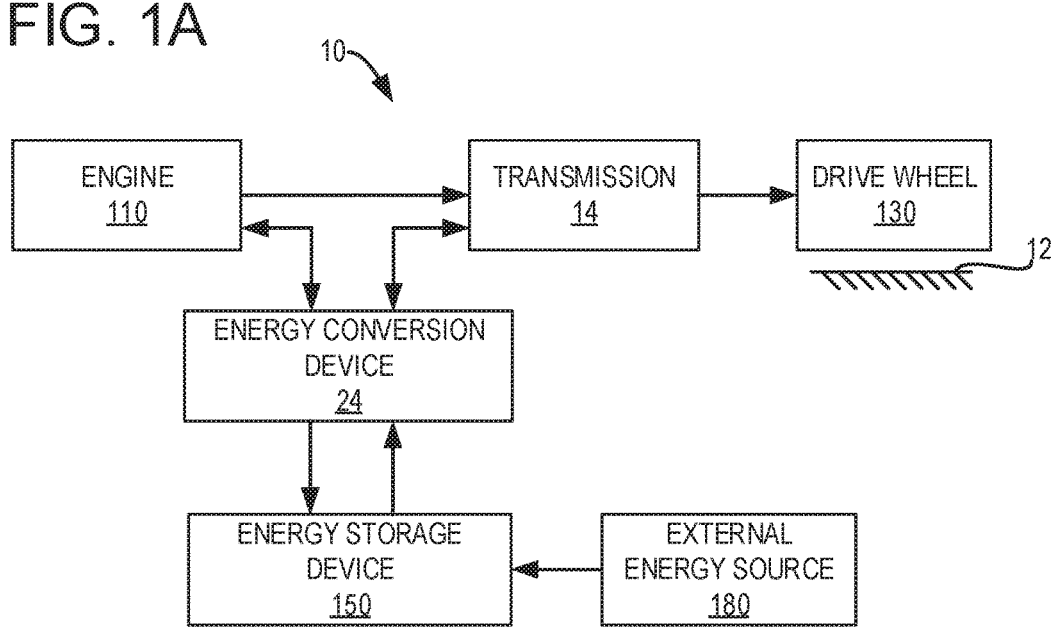
FIG. 1A shows a first schematic diagram of an example vehicle system, in accordance with an embodiment of the present disclosure.

Referring to FIG. 1A, the figure schematically depicts a vehicle with a hybrid propulsion system 10. Hybrid propulsion system 10 includes an internal combustion engine 110, coupled to transmission 14. Transmission 14 may be a manual transmission, automatic transmission, or combinations thereof. Further, various additional components may be included, such as a torque converter, and/or other gears such as a final drive unit, etc. Transmission 14 is shown coupled to drive wheel 130, which in turn is in contact with road surface 12.

In this example embodiment, the hybrid propulsion system also includes an energy conversion device 24, which may include a motor, a generator, among others and combinations thereof. The energy conversion device 24 is further shown coupled to an energy storage device 150, which may include a battery, a capacitor, a flywheel, a pressure vessel, etc. The energy storage device 150 may receive electrical power from a power source 180. Thus, the energy storage device 150 may be re-charged via the power source 180. The energy conversion device can be operated to absorb energy from vehicle motion and/or the engine and convert the absorbed energy to an energy form suitable for storage by the energy storage device (i.e. provide a generator operation). The energy conversion device can also be operated to supply an output (power, work, torque, speed, etc.) to the drive wheel 130 and/or engine 110 (i.e. provide a motor operation). It should be appreciated that the energy conversion device may, in some embodiments, include only a motor, only a generator, or both a motor and generator, among various other components used for providing the appropriate conversion of energy between the energy storage device and the vehicle drive wheels and/or engine.

The depicted connections between engine 110, energy conversion device 24, transmission 14, and drive wheel 130 indicate transmission of mechanical energy from one component to another, whereas the connections between the energy conversion device and the energy storage device may indicate transmission of a variety of energy forms such as electrical, mechanical, etc. For example, torque may be transmitted from engine 110 to drive the vehicle drive wheel 130 via transmission 14. As described above energy conversion device 24 may be configured to operate in a generator mode and/or a motor mode. In a generator mode, system 18 absorbs some or all of the output from engine 110 and/or transmission 14, which reduces the amount of drive output delivered to the drive wheel 130, or the amount of braking torque to the drive wheel 130. Such operation may be employed, for example, to achieve efficiency gains through regenerative braking, improved engine efficiency, etc. Further, the output received by the energy conversion device may be used to charge energy storage device 150. In motor mode, the energy conversion device 24 may supply mechanical output to engine 110 and/or transmission 14, for example by using electrical energy stored in an electric battery.

For example, the energy conversion device 24 may be used as a starter motor to start engine 110. Thus, the energy conversion device 24 may convert stored electrical energy in the energy storage device 150 to rotational mechanical energy to drive and start engine 110. In another example, the energy storage device 150 and energy conversion device 24 may be used to spin the engine 110 when hydrocarbon breakthrough from a fuel vapor storage canister is detected and/or is imminent, such as during an evaporative leak test of an evaporative emissions (EVAP) system.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller as will be describe below with reference to FIG. 2.

From the above, it should be understood that the exemplary hybrid propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 110 is turned on, and acts as the only torque source powering drive wheel 130. In still another mode, which may be referred to as an "assist" mode, the alternate torque source 18 may supplement and act in cooperation with the torque provided by engine 110. As indicated above, energy conversion device 24 may also operate in a generator mode, in which torque is absorbed from engine 110 and/or transmission 14. Furthermore, energy conversion device 24 may act to augment or absorb torque during transitions of engine 110 between different combustion modes (e.g., during transitions between a spark ignition mode and a compression ignition mode).

Figure 1B:
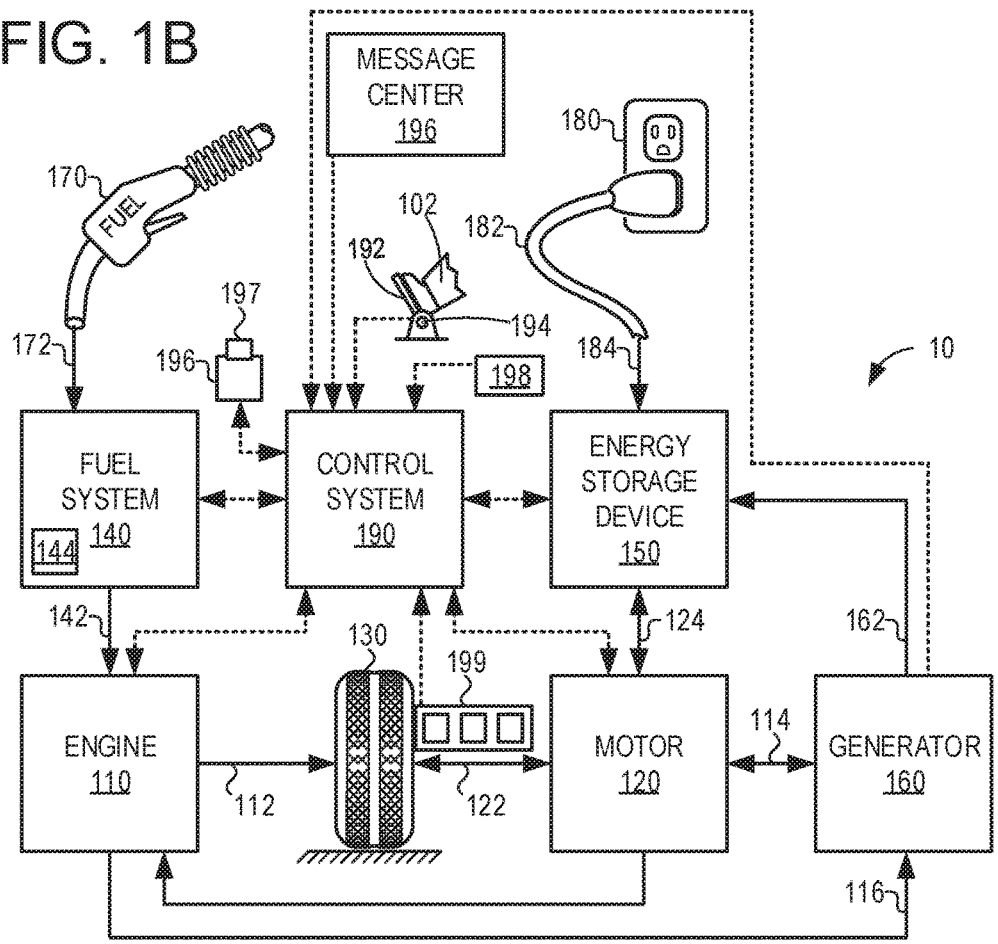
FIG. 1B shows a second schematic diagram of the example vehicle system of FIG. 1A, in accordance with an embodiment of the present disclosure.

FIG. 1B illustrates a more detailed example of the hybrid propulsion system 10. As described above with reference to FIG. 1A, propulsion system 10 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated. In another example, the motor 120 may spin the engine 110 such as when starting the engine 110, and/or when pulling fuel vapors away from a fresh air end of a fuel vapor canister of an EVAP system of the system 10.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 10 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors. Thus, energy storage device 150 may be referred to herein as vehicle battery 150. The battery 150 may thus be a re-chargeable battery. As such, the battery 150 may comprise one or more of lithium-ion, nickel metal hydride, molten salt, or other rechargeable type battery chemistries. In yet further example, the battery 150 may comprise a lead-acid type battery.

Control system 190 may communicate with one or more of engine 110, motor 120, fuel system 140, energy storage device 150, and generator 160. As will be described by the process flow of FIGS. 7 and 9, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 10 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 10 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 10 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
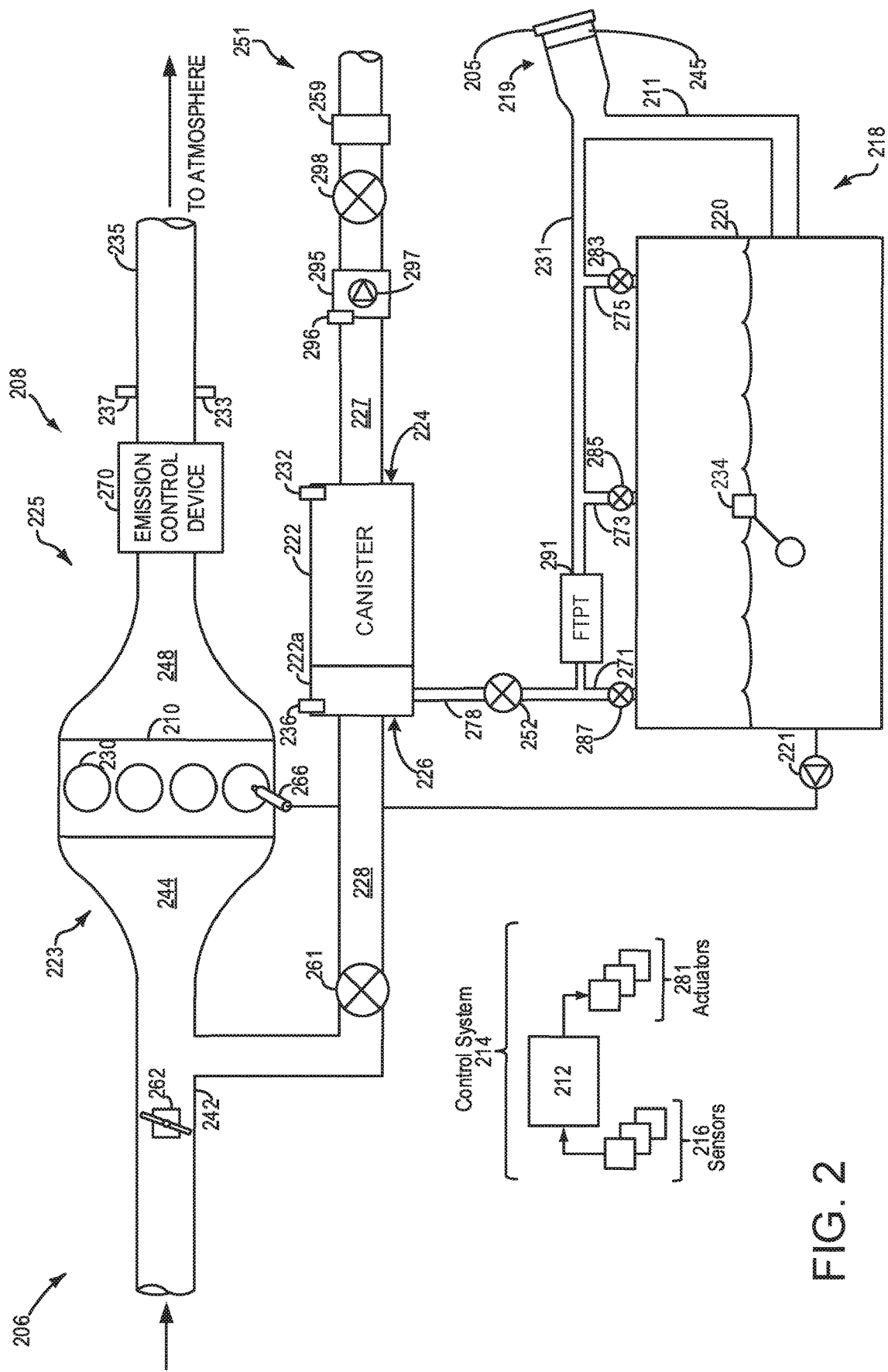
FIG. 2 shows a schematic diagram of an example vehicle system with a fuel system and an evaporative emissions control system including an evaporative leak check module, in accordance with an embodiment of the present disclosure.

FIG. 2 shows a schematic depiction of a vehicle system 206 including an evaporative emissions control (EVAP) system 251. The vehicle system 206 includes an engine system 208 coupled to the emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Engine 210 may be the same or similar to engine 110 described above with reference to FIGS. 1A and 1B. Thus, the engine 210 may be started and/or spun by a motor (e.g., energy conversion device 24 described above in FIG. 1A) receiving electrical energy from a vehicle battery (e.g., energy storage device 150 described above in FIGS. 1A-1B). The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to the evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a refueling system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as fuel vapor canister 222 filled with an appropriate adsorbent, the canister 222 may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister 222. In comparison, during canister purging, fuel vapors are first desorbed from the canister (e.g., to a threshold amount) before being desorbed from the buffer. In other words, loading and unloading of the buffer 222a may not linear with the loading and unloading of the canister 222. As such, the effect of the canister buffer 222a may be to dampen fuel vapor spikes flowing from the fuel tank to the canister 222, thereby reducing the possibility of fuel vapor spikes going to the engine 210.

The buffer 222a may be positioned at a second end 226 of the canister 222, opposite a fresh air first end 224 of the canister 222. Thus, the buffer 222a and second end 226 of the canister 222 may be positioned more proximate the intake manifold 244 than the first end 224. Further, the first end 224 of the canister 222 may be positioned more proximate the atmosphere and a canister vent valve 298 than the second end 226 of the canister 222. As such, the first end 224 may also be referred to herein as canister vent side 224, and second end 226 may also be referred to herein as canister purge side 226. The canister 222 may include one or more sensors for estimating an amount of fuel vapors stored in the canister 222. For example, the canister 222 may include one or more temperature sensors and/or pressure sensors. As fuel vapor is adsorbed by the adsorbent in the canister, heat may be generated (heat of adsorption). Likewise, as fuel vapor is desorbed by the adsorbent in the canister, heat may be consumed. Thus, an increase in fuel vapor levels in the canister 222 may be proportional to an increase in temperature. In this way, the adsorption and desorption of fuel vapor by the canister may be monitored and estimated based on temperature changes within the canister 222.

In the example of FIG. 2, the canister 222 includes two temperature sensors. Second temperature sensor 236 may be positioned at or proximate the second end 226 of the canister 222. In particular, the second temperature sensor 236 may be positioned within the buffer 222a, in some examples. First temperature sensor 232 may be positioned at or proximate the first end 224 of the canister 222. Thus, the first temperature sensor 232 may be positioned more proximate the first end 224 than the second temperature sensor 236, and the second temperature sensor 236 may be positioned more proximate the second end 226 of the canister 222 than the first temperature sensor 232. In this way, an amount of fuel vapors and/or a rate of change in fuel vapor levels at the second end 226 of the canister 222 may be inferred based on outputs from the second temperature sensor 236. Similarly, an amount of fuel vapors and/or a rate of change in fuel vapor levels at the first end 224 of the canister 222 may be inferred based on outputs from the first temperature sensor 232. In particular, a rate of increase of fuel vapors and/or an amount of fuel vapors in the canister 222 at the second end 226 may increase for increasing rates of temperature increase and/or increasing temperatures at the second end 226 as measured via the second temperature sensor 236. Similarly, a rate of increase of fuel vapors and/or an amount of fuel vapors in the canister 222 at the second end 232 may increase for increasing rates of temperature increase and/or increasing temperatures at the first end 224 as measured via the first temperature sensor 232. In this way, an amount of fuel vapors at the first and second ends 226 and 224 respectively, of the canister 222 may be estimated based on outputs from the temperature sensors 236 and 232, respectively.

Said another way, an amount or concentration of fuel vapors in the canister 222 may be estimated based on a temperature profile of the canister. That is, the change in temperature over time of the canister 222 may be monitored to determine fluctuations in the amount of fuel vapors in the canister 222, where an amount of fuel vapors may increase for increases in the temperature of the canister, and may decrease for decreases in the temperature of the canister. Thus, when an area of the canister 222 becomes substantially full or saturated with fuel vapors, the temperature of that area of the canister may stabilize and remain approximately constant. Thus, when the temperature stops increasing and starts to decrease at the fresh air first end 224 (e.g., an inflection point is reached), fuel vapor bleed-through may indicated and the engine may be started to pull fuel vapors away from the fresh air end 224 of the canister 222.

Vent line 227 may allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold 244.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister 222 are combusted in the engine. The purging may be continued until the stored fuel vapor amount in the canister is below a threshold.

As yet another example, the fuel system 218 and EVAP system 251 may be operated in a vapor redistribution mode, where the distribution of fuel vapors within the canister 222 may be adjusted by spinning the engine 210 and opening the CPV 261. In particular, when breakthrough of hydrocarbons is detected and/or is imminent at the first end 224 of the canister 222, such as during a leak detection test, the engine 210 may be spun to pull fuel vapors away from the first end 224 and towards the second end 226, as described in greater detail below with reference to the FIGS. 4 and 5. The CPV 261 may be opened to fluidically couple the engine 210 to the canister 222. Thus, when fuel vapor levels increase above a threshold, and/or fuel vapor levels increase at more than a threshold rate, at the first end 224 of the canister 222, the controller 212 may send signals to a motor (e.g., motor 120 described above with reference to FIG. 1B) to crank the engine 210 and spin the engine 210 until fuel vapors in the canister 222 are pulled away from the first end 224. Thus, the motor may spin the engine 210 until fuel vapor levels at the first end 224 increase by more than a threshold amount and/or fuel vapor levels at the first end 224 decrease by more than a threshold amount. In this way, breakthrough of hydrocarbons to the atmosphere may be reduced and/or prevented.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensors 232 and 236. Other sensors such as pressure, temperature, air/fuel ratio, and composition sensors may be coupled to various locations in the vehicle system 206. As another example, the actuators may include fuel injector 266, throttle 262, fuel tank isolation valve 252, pump 297, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIGS. 5 and 6.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent line 227, between canister 222 and the atmosphere. ELCM 295 may include a vacuum pump 297 for applying negative pressure to the fuel system 218 and/or EVAP system 251 in a first direction when administering a leak test. In some embodiments, the vacuum pump 297 may be configured to be unidirectional. In other words, the vacuum pump 297 may be configured to apply negative pressure on the fuel system 218 and/or EVAP system 251 in the first direction only. That is, the pump 297 when powered on may draw gasses from the fuel system 218 and/or EVAP system 251 towards the pump 297, and push the gasses towards the atmosphere. Thus, the vacuum pump 297 may pull gasses from the fuel system 218 and/or EVAP system 251, and push them out of the vent line 227 to the atmosphere. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed. An amount of power output by the pump 297 may be varied based on signals received from controller 212. Thus controller may vary an amount of electrical power supplied to an actuator of the pump 297. In some examples, the pump 297 may be powered by a vehicle batter (e.g., energy storage device 150 described above in FIGS. 1A and 1B). In other examples, the pump 297 may include its own internal power source or battery.

As described above, if hydrocarbon breakthrough from the canister 222 is detected and/or is determined to be imminent during the leak test, the leak test may be temporarily paused or cancelled. Subsequently the CPV 261 may be opened and the engine 210 may be spun via a motor. The negative pressure generated by the spinning engine may be used to pull fuel vapors within the canister 222 away from the fresh air first end 224 of the canister 222. Thus, the spinning engine may apply vacuum to the canister 222 when the CPV 261 is open, in a second direction, opposite the first direction. Thus, the spinning engine may pull hydrocarbons within the canister 222 in a direction opposite the pump 297. That is, the pump 297 when powered on may pull hydrocarbons in the canister 222 towards the first end 224 of the canister, while the engine 210 when spinning with the CPV 261 open may pull hydrocarbons in the canister 222 towards the second end 226 of the canister 222. The leak test may then resume once fuel vapors levels at the fresh air second end are sufficiently reduced and/or the control system 214 may wait until conditions for the leak test are satisfied before initiating another leak test.

Canister vent valve (CVV) 298 may function to adjust a flow of air and vapors between canister 222 and the atmosphere. The CVV may also be used for diagnostic routines. When included, the CVV 298 may be opened during fuel vapor storing operations (for example, during fuel tank refueling and while the engine is not running) so that air, stripped of fuel vapor after having passed through the canister, can be pushed out to the atmosphere. Thus, when the FTIV 252 is opened to discharge fuel vapors from the fuel tank 220 to the canister 222, the CVV 298 may be opened to facilitate the flow of gasses from the fuel tank 220 to the canister 222. The canister 222 may trap fuel vapors in the gasses received from the fuel tank 220, and the remaining air stripped of fuel vapors, may pass out of the vent line 227, through the open CVV 298 to the atmosphere.

Likewise, during a leak test where the pump 297 is powered on to draw gasses out of the fuel system 218 and/or EVAP system 251, the CVV 298 may be opened to permit the gasses from the fuel system 218 and/or EVAP system 251 to exit the vent line 227 to the atmosphere.

In another example, during purging operations (for example, during canister regeneration and while the engine is running), the CVV 298 may be opened to allow a flow of fresh air to strip the fuel vapors stored in the canister. Thus, the CPV 261 and CVV 298 may be opened while the engine is running to pull fresh air through the canister 222, to strip the fuel vapors from the canister 222 and purge the desorbed vapors to the intake manifold 244. In some examples, CVV 298 may be a solenoid valve wherein opening or closing of the valve is performed via actuation of a canister vent solenoid.

Figure 3B:
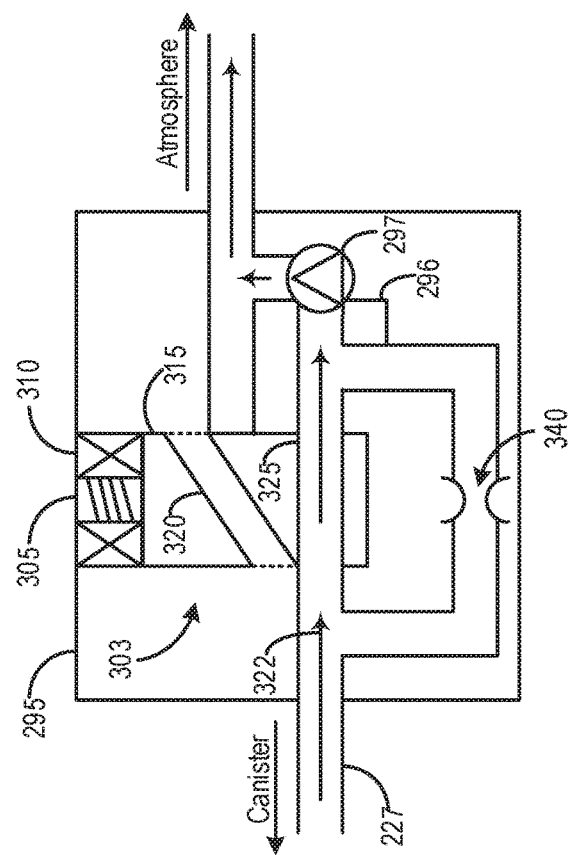
FIG. 3B shows a schematic depiction of an evaporative leak check module in a configuration to perform a fuel system evacuation leak check, in accordance with an embodiment of the present disclosure.
Figure 3A:
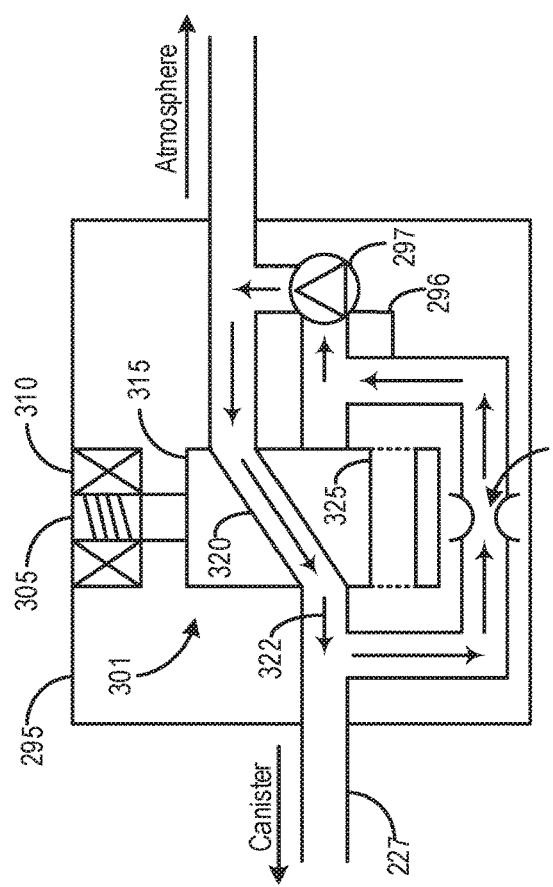
FIG. 3A shows a schematic depiction of an evaporative leak check module in a configuration to perform a reference check, in accordance with an embodiment of the present disclosure.
Figure 3C:
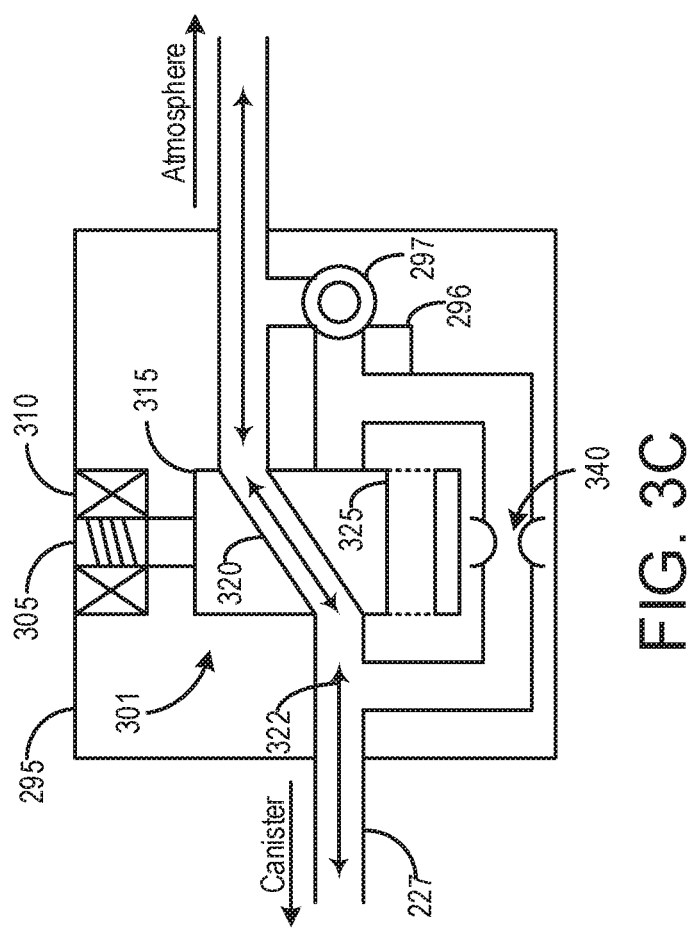
FIG. 3C shows a schematic depiction of an evaporative leak check module in a configuration to perform a purge operation, in accordance with an embodiment of the present disclosure.

FIGS. 3A-3C show a schematic depiction of an embodiment of the ELCM 295 in various conditions. As shown in FIG. 2, ELCM 295 may be located along vent line 227 between canister 222 and atmosphere. ELCM 295 includes a changeover valve (COV) 315, pump 297, and pressure sensor 296. The ELCM 295 may periodically perform a leak test of the EVAP system 251 (not shown in FIGS. 3A-3C) and/or the fuel system 218 (not shown in FIGS. 3A-3C). COV 315 may be adjustable between a first position and a second position. In particular, an actuator (e.g., solenoid 310 shown in FIGS. 3A-3C) of the COV 315 may adjust a position of the COV 315 based on signals received from a controller (e.g., controller 212 described above in FIG. 2). Thus, the controller may send signals to the actuator of the COV 315 to adjust the position of the COV 315.

In a first position 301, as shown in FIGS. 3A and 3C, air may flow through ELCM 295 via first flow path 320. In a second position 303, as shown in FIG. 3B air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". However, in other examples, the diameter of the orifice 340 may be greater or less than 0.02". In either the first or second position, pressure sensor 296 may generate a pressure signal reflecting the pressure within ELCM 295. Operation of pump 297 and solenoid 310 may be controlled via signals received from controller 212.

As shown in FIG. 3A, COV 315 is in the first position 301, and pump 297 is activated to draw air through the orifice 340 and towards the pressure sensor 296 and pump 297 as depicted by the flow arrows 322 in FIG. 3A. Fuel tank isolation valve 252 (not shown in FIG. 3A) may closed, isolating ELCM 295 from the fuel tank. Air flow through ELCM 295 in this configuration is represented by arrows 322. In this configuration, pump 297 may draw a vacuum on reference orifice 340, and pressure sensor 296 may record the vacuum level within ELCM 295. This reference check vacuum level reading may then become the threshold for passing/failing a subsequent leak test. Thus, COV 315 may be adjusted to the first position, as shown in FIG. 3A, during a reference check portion of a leak test.

During the reference check portion of the leak test, the COV 315 may be adjusted to the first position 301, and the pump 297 may be powered on. While the pump 297 is running during the reference check portion of the leak test, a pressure profile may be generated based on outputs from the pressure sensor 296. Then during a subsequent leak check portion of the leak test, the pressure in the ELCM 295 may be compared to the pressure profile generated during the reference check portion of the leak test. If the pressure in the ELCM 295 deviates by more than a threshold from the pressure profile generated during the reference check portion of the leak test, then it may be determined that there is a leak in the fuel system and/or EVAP system. Thus, if the pump 297 fails to reduce the pressure in the ELCM 295 to below a threshold pressure within a threshold duration, then a leak may be detected. Said another way, a pass/fail pressure profile may be generated based on the pressure profile generated during the reference check portion of the leak test. The pressure in the ELCM 295 during the leak check portion of the leak test may be compared to the pass/fail pressure profile to determine if there is a leak in one or more of the fuel system and/or EVAP system.

As shown in FIG. 3B, COV 315 is in the second position 303, and pump 297 is activated to pull gasses from the canister 222 (not shown in FIG. 3B) out to the atmosphere. Thus, the COV 315 may be adjusted to the second position 303 during the leak check portion of the leak test to evacuate gasses from the fuel tank and/or fuel canister. This configuration allows pump 297 to draw a vacuum on fuel system 218 (not shown in FIG. 3B). In examples where fuel system 218 includes FTIV 252, FTIV 252 may be opened to allow pump 297 to draw a vacuum on fuel tank 220. Air flow through ELCM 295 in this configuration is represented by arrows 322. In the absence of a leak the vacuum level in ELCM 295 may reach and/or exceed a vacuum threshold within the threshold duration as determined during the reference check portion of the leak test. In the presence of a leak larger than the reference orifice 340, the pump 297 may fail to reduce the pressure in the ELCM 295 to below the threshold pressure within the threshold duration. Thus, when the pump 297 fails to reduce the pressure in the ELCM 295 to below a threshold pressure, and/or the pump 297 fails to reduce the pressure in the ELCM 295 at more than a threshold rate, then a leak may be detected.

As shown in FIG. 3C, COV 315 is in the first position, and pump 297 is de-activated or powered off. The COV 315 may be adjusted to the first and the pump 297 may be powered off during a purging operation. In this way, fresh air may flow through the COV 315 towards the canister 222 and engine intake 223 (not shown in FIG. 3C).

Thus, in this way, the COV 315 may be adjusted to the first position and the pump 297 may be powered on during the reference check portion of a leak test to generate an reference pressure profile against which the pressure in the ELCM 295 may be compared during a leak check portion of a leak test to determine whether or not a leak exists in one or more of the fuel system and/or EVAP system. The COV 315 may be adjusted to the second position and the pump 297 may be powered on during the leak check portion of the leak test, and the pressure in the ELCM 295 may be monitored and compared to the reference pressure profile generated during the reference check portion of the leak test. In this way, by comparing the pressure profiles generated during the reference check and leak check portions of the leak test, a leak may be detected. In particular, a first pressure profile generated by the pump 297 when the COV 315 is in the first position may be compared to a second pressure profile generated by the pump 297 when the COV 315 is in the second position to determine whether or not a leak exists in the fuel system and/or EVAP system.

In some examples, each leak test may comprise both the reference check portion and the leak check portion. Thus, each time a leak test is performed, the reference check portion may be run and the COV 315 may first be adjusted to the first position and then subsequently the leak check portion may be run and the COV 315 may be adjusted to the second position. However, in other examples, the leak test may only comprise the leak check portion or the reference check portion. In particular, the reference check portion may be performed at a lower frequency than the leak test. For example, the pressure profile and/or results from the reference check may be stored in memory of the controller 212, and used during subsequent leak tests. Thus, a single reference check may be used for multiple leak tests. Thus, pressure profiles generated during leak check portions of multiple leak tests may be compared to the same and/or similar pressure profile generated during a single reference check portion of a previous leak test.

Figure 4:
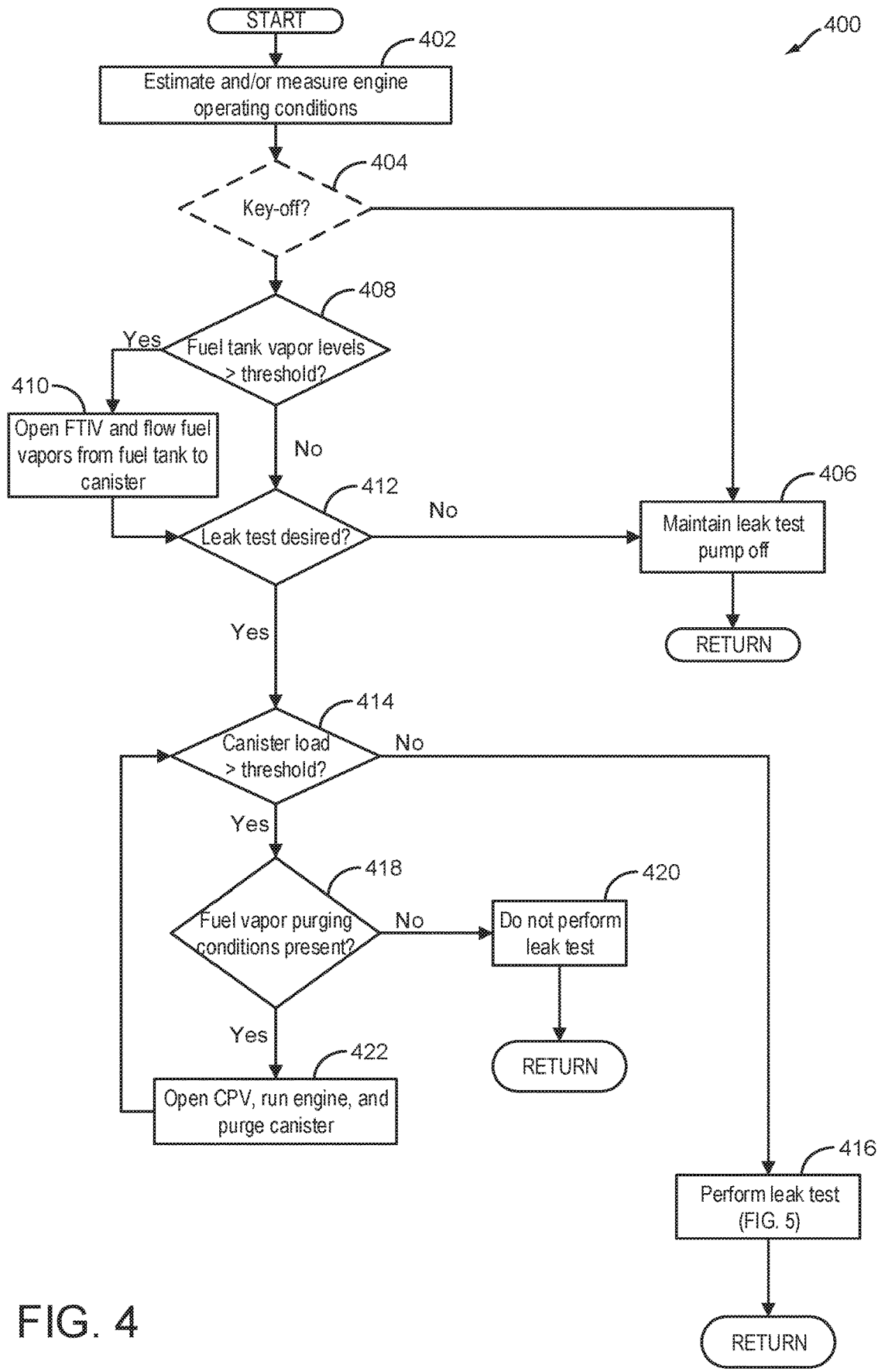
FIG. 4 shows a flow chart of an example method for determining when to perform a leak test of a fuel system and/or an evaporative emissions control system such as those of FIG. 2, in accordance with an embodiment of the present disclosure.
Figure 5:
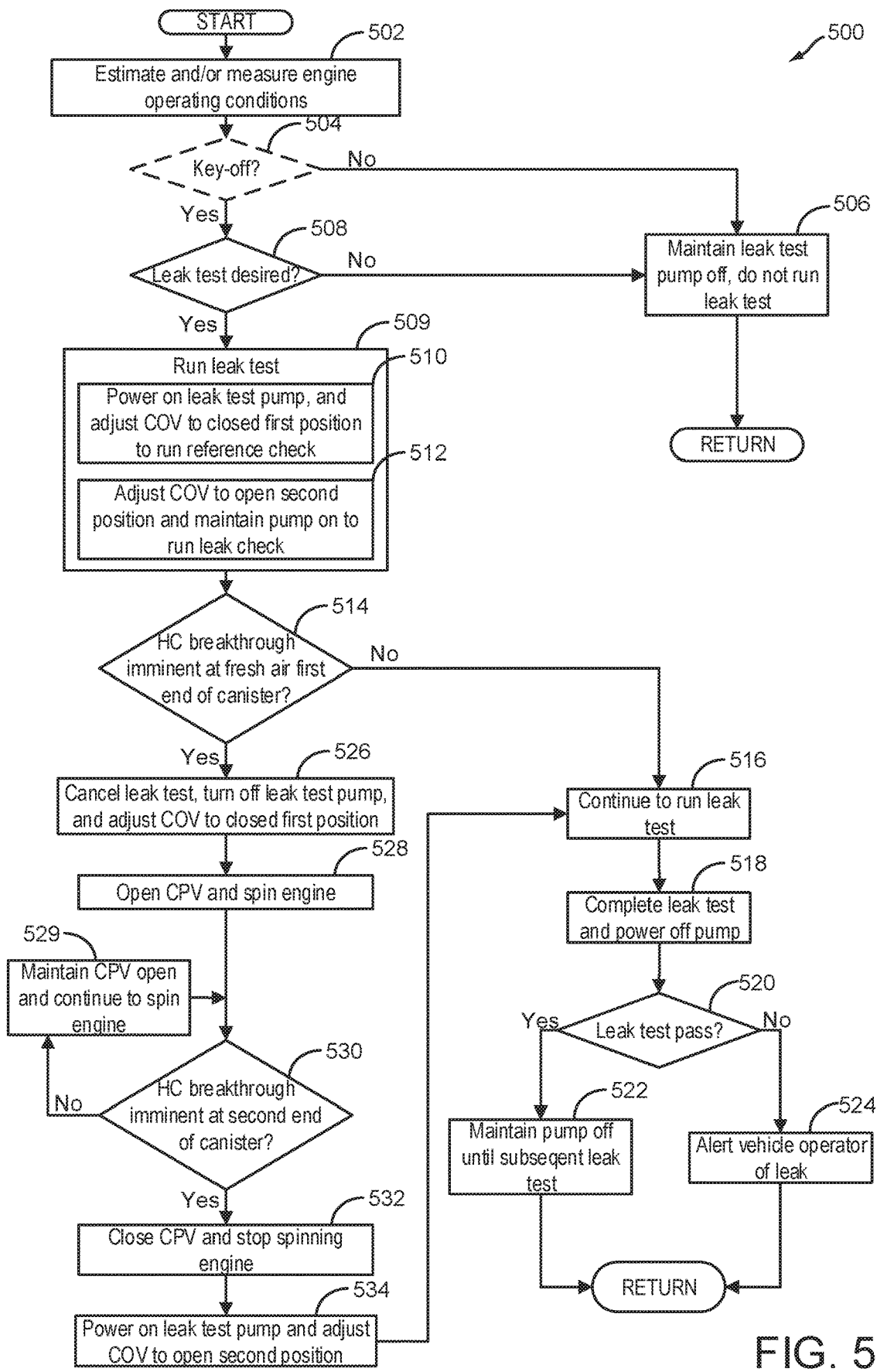
FIG. 5 shows a flow chart of an example method for running a leak test of a fuel system and/or an evaporative emissions control system, in accordance with an embodiment of the present disclosure.
Figure 6:
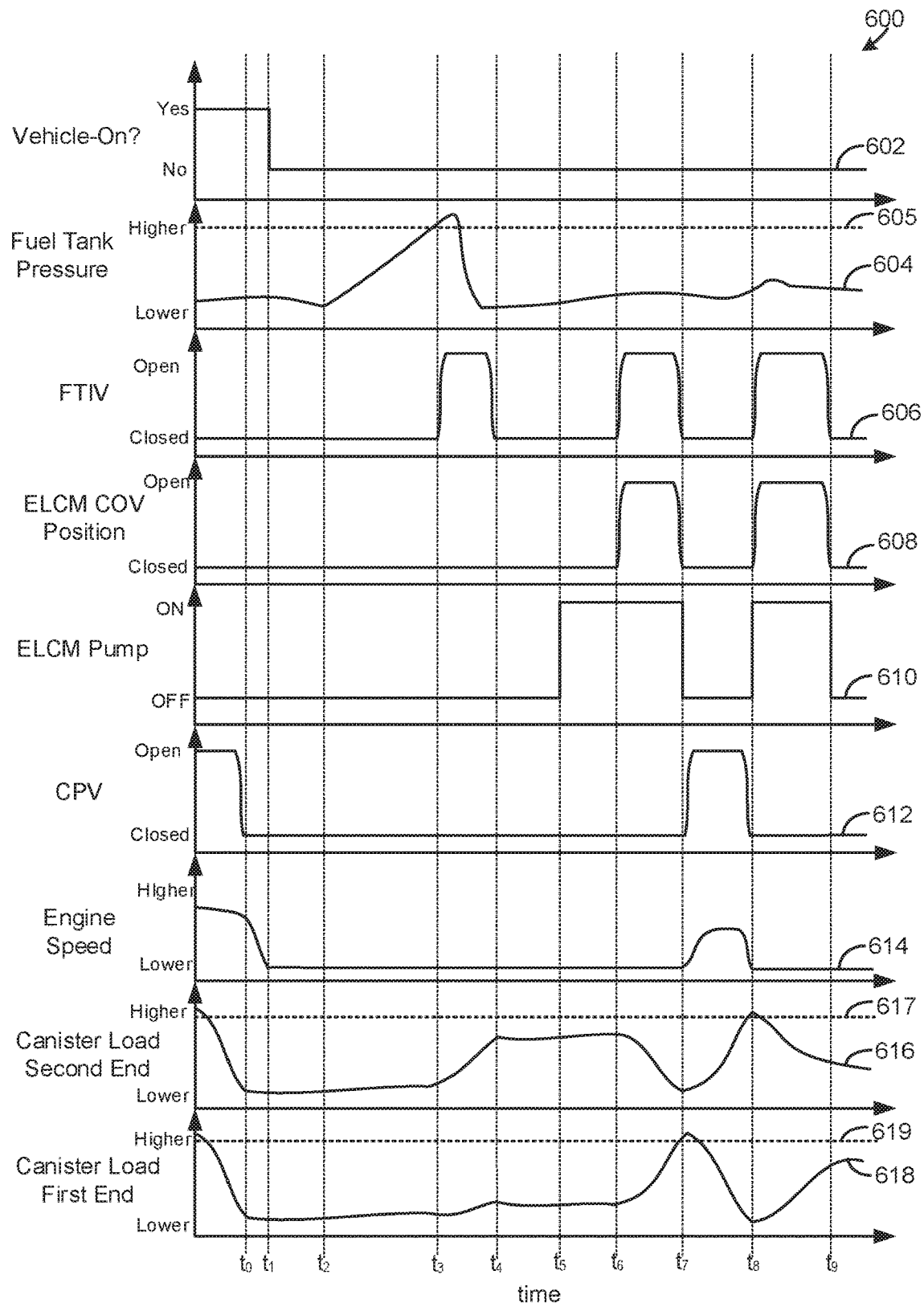
FIG. 6 shows a graph depicting example adjustments to a leak check module of an evaporative emissions control system under varying vehicle operating conditions.

Turning now to FIGS. 4 and 5, they show example methods for running a leak test of an EVAP system (e.g., EVAP system 251 described above in FIG. 2) and/or fuel system (e.g., fuel system 218 described above in FIG. 2). The methods described in FIGS. 4 and 5 may be stored in non-transitory memory of a controller (e.g., controller 212 described above in FIG. 2), and may be executed by the controller. The controller may adjust operation of a leak test module (e.g., ELCM 295 described above in FIGS. 2-3C), the leak test module including a leak test pump (e.g., vacuum pump 297 described above in FIGS. 2-3D) and a change-over valve (e.g., COV 315 described above in FIGS. 3A-3C). In particular, the method described in FIG. 4 may be executed to determine when to run a leak test. The method described in FIG. 5, may be executed when it is desired to run a leak test. Further, the method described in FIG. 5, may include instructions for redistributing fuel vapors within in a fuel vapor canister (e.g., canister 222 described above in FIG. 2) to prevent and/or reduce hydrocarbon emissions during a leak test.

Focusing now to FIG. 4, it shows a flow chart of an example method 400 for preparing to perform a leak test, such as the leak test of the EVAP system and/or fuel system as described above with reference to FIGS. 2-3C. In particular, the method 400 in FIG. 4, may be executed to determine when to perform a leak test. Further, the method 400 may comprise adjusting one or more engine operating conditions to enable running the leak test. For example, when fuel vapor levels in the canister of the EVAP system increase above a threshold, running a leak test may cause fuel vapors stored in the canister to escape to the atmosphere leading to increased emissions. Thus, in some examples, a leak test may not be run when fuel vapor levels in the canister are greater than a threshold. In other examples, the canister may be purged to reduce fuel vapor levels in the canister before initiating a leak test.

Method 400 begins at 402 which comprises estimating and/or measuring engine operating conditions. Engine operating conditions may include one or more of a driver demanded torque, engine speed, engine temperature, intake mass airflow, canister load, fuel tank pressure, intake manifold vacuum level, etc. In particular, the fuel tank pressure may be estimated based on outputs from a fuel tank pressure sensor (e.g., fuel tank pressure transducer 291 described above in FIG. 2), driver demanded torque may be estimated based on an accelerator pedal position, as determined based on outputs from a pedal position sensor (e.g., pedal position sensor 194 described above in FIG. 1B), and canister load may be estimated from one or more temperature sensors (e.g., temperature sensors 232 and 236 described above in FIG. 2) coupled to the canister.

After estimating and/or measuring engine operating conditions, method 400 may then continue from 402 to 404 which comprises determining if a key-off event has occurred. Thus, the method 400 at 404 may comprise determining whether a motor vehicle (e.g., hybrid propulsion system 10 described above in FIGS. 1A and 1B) is off. A key-off event may comprise a vehicle operator request to power off the vehicle. In some examples, the key-off event may be triggered by a key in an ignition in keyed vehicle systems. However, in other examples, where the vehicle system may be keyless, the key-off event may be initiated by a button, touch display, or other user interface device.

In some examples, if a key-off event has not occurred, and the vehicle is on, method 400 may continue from 404 to 406 which comprises maintaining the leak test pump (e.g., vacuum pump 297 described above with reference to FIGS. 2-3C) off and not running a leak test. Method 400 then returns.

However, in other examples method 400 may continue from 404 to 408 if it is determined that a key-off event has occurred at 404 and the vehicle is off. In yet further examples, method 400 may not include determining if a key-off event has occurred and may proceed directly from 402 to 408 after estimating and/or measuring engine operating conditions. Method 400 at 408 comprises determining if fuel tank vapor levels are greater than a threshold. Fuel tank vapor levels may be estimated based on a pressure in a fuel tank (e.g., fuel tank 220 described above in FIG. 2) as estimated based on outputs from the fuel tank pressure sensor. Thus, fuel tank vapor levels may increase for increases in the fuel tank pressure.

If it is determined at 408 that the fuel tank vapor levels are greater than the threshold, then it may be desired to vent the fuel tank to the canister, and as such, method 400 may continue from 408 to 410 which comprises opening a fuel tank isolation valve (e.g., FTIV 252 described above in FIG.

2) and flowing fuel vapors from the fuel tank to the canister. For example, the FTIV may be opened, and the fuel tank may be vented prior to and/or during a refueling event. Method 400 at 410 may further comprise opening a canister vent valve (e.g., CVV 298 described above in FIG. 2) to facilitate the flow of fuel vapors from the fuel tank to the canister. Thus, the fuel tank may be vented to the canister, when the fuel vapor level in the fuel tank increase above the threshold, such as during a refueling event, and/or due to increases in fuel tank temperature.

Method 400 may then continue from 410 to 412 which comprises determining if a leak test is desired. Alternatively, if it is determined at 408 that fuel tank vapor level are not greater than the threshold, then method 400 may proceed directly from 408 to 412 and determine whether a leak test is desired. Leak tests may be performed at regular intervals, such as after a threshold duration has passed since a most recent test. Thus, the method 400 at 412 may comprise determining if more than a threshold duration has passed since the most recent leak test, and that if the duration has passed, then determining that a leak test is desired. The duration may be an amount of time, a number of engine cycles, a number of vehicle on/off sequences, etc. Further, the leak test may only be performed when the vehicle is off in some examples. In some examples a leak test may be performed after every key-off event. Leak tests may be performed at regular time intervals after a vehicle is powered off, for example. However, in other examples, a leak test may only be desired after a threshold number of vehicle key-off events since a most recent leak test. Thus, leak test may not be performed after each key-off event. In yet further examples, a leak test may be performed when the vehicle is on.

In yet further examples, the timing of a leak test may be adjusted based on one or more of a refueling event, an amount of fuel dispensed during the refueling event, canister purging, canister load, fuel tank vapor levels in the fuel tank, etc. For example, decreases in the frequency of tank venting to the canister may be indicative of a leak in the fuel tank, as fuel tank pressure may not reach high enough levels to initiate tank venting when a leak is present in the fuel tank. Thus, a leak test may be desired in response to decreases in the frequency of tank venting to the canister.

If it is determined at 412 that a leak test is not desired, then method 400 may proceed from 412 to 406 and maintain the leak test pump off. Thus, a leak test may not be performed. Method 400 then returns.

However, if at 412 it is determined that a leak test is desired, then method 400 may proceed from 412 to 414 which comprises determining if a canister load is greater than a threshold. As described above, the canister load may be estimated based on outputs from one or more temperature sensors coupled to the canister. In some examples, the threshold may represent a total volume or mass of fuel vapors in the canister. In other examples, the threshold may represent an amount of fuel vapors present at a fresh air end of the canister (e.g., fresh air first end 224 described above in FIG. 2) more proximate the leak test pump. The threshold may be a pre-set value corresponding to an amount of fuel vapors in the canister that may be stored in memory of the controller. In some examples, the threshold may correspond to an approximately full canister (e.g., 100% full). However, in other examples, the threshold may correspond to a canister that is not completely full of fuel vapors.

If the canister load is not greater than the threshold at 414, then method 400 may continue from 414 to 416 which comprises performing the leak test. An example method for performing a leak test is described in greater detail below with reference to FIG. 5. In particular, performing the leak test may comprise powering on the leak test pump and applying negative pressure to the canister and/or fuel tank to draw gasses out of the EVAP system and/or fuel system. Method 400 then returns.

However, if at 414 it is determined that the canister load is greater than the threshold, then method 400 may continue from 414 to 418 which comprises determining if fuel vapor purging conditions are present. For example, fuel vapor purging conditions may include one or more of: engine spinning, fuel injection on, intake manifold vacuum more than a threshold, temperature of an exhaust catalyst (e.g., emission control device 270 described above in FIG. 2), etc. Thus, if the engine is not running, and/or fuel injection is off such as during deceleration fuel shut-off (DFSO), then fuel vapor purging conditions may not exist. However, in some examples, if the engine is off, the engine may be cranked by a starter motor (e.g., motor 120 described above in FIG. 1B) to enable purging of the canister. Further, purging may be enabled or disabled based on an amount of secondary gas flow to an intake manifold (e.g., intake manifold 244 described above in FIG. 2). For example, during high positive crankcase ventilation (PCV) flow, and/or high brake booster flow, purging may not be enabled due to the lower budget available for additional secondary gas flow to the intake manifold.

If it is determined that fuel vapor purging conditions are not present at 418, then method 400 may continue from 418 to 420 which comprises not performing the leak test. Thus, the leak test pump may not be powered on. Method 400 then returns. Thus, if the canister load is greater than a threshold, and the canister cannot be purged prior to running a leak test, then the leak test may not be run. When the canister load is greater than the threshold, initiating and/or running the leak test may result in hydrocarbon breakthrough from the canister and subsequent hydrocarbon escape to the atmosphere. Thus, by prohibiting a leak test when the canister load is greater than the threshold, an amount of hydrocarbons emissions may be reduced.

Returning to 418, if it is determined that fuel vapor purging conditions are present, then method 400 may continue to 422 which comprises opening a CPV (e.g., CPV 261 described above in FIG. 2), running the engine, and purging the canister. In some examples, if the engine is off at 422, the method 400 at 422 may comprise cranking the engine with a motor, and then initiating combustion by injecting fuel into one or more engine cylinders (e.g., cylinders 230 described above in FIG. 2). If the engine is already running at 422, the method 400 at 422 may comprise continuing to operate the engine with fuel. Opening the CPV may comprise sending signals from the controller to an actuator of the CPV, to adjust the position of the valve to a more open position such that an opening formed by the valve increases. The method 400 at 422 may additionally comprise opening the CVV to enhance fuel desorption from the canister. The canister may be purged for a threshold duration. In other examples, the canister may be purged until the canister load decreases below a threshold.

Method 400 may then return to 414 to determine if the canister load is greater than the threshold after purging the canister at 422. Thus, the method 400 may comprise purging the canister until the canister load is less than the threshold. Said another way, the canister may be purged until the canister load decreases below the threshold. In this way, by purging the canister when it is substantially full, prior to a leak test, fuel vapor levels in the canister may be reduced sufficiently such that during the leak test, the fuel vapor distribution within the canister may be adjusted by, for example, spinning the engine unfueled and pulling fuel vapors within the canister towards the engine. Further, hydrocarbon emissions from the canister may be reduced by purging the canister.

Thus, if the canister load is still greater than the threshold at 414, then method may continue to 418 as described above. However, if after purging the canister, the canister load has decreased below the threshold, then method 400 may continue from 414 to 416, and may perform a leak test as described below with reference to the example method of FIG. 5. Method 400 then returns.

It should be appreciated that in some examples, method 400 may proceed directly from 412 to 416 if it is determined that a leak test is desired at 412. Thus, in some examples, the method may not execute 414, 418, 420, and 422, and thus a leak test may be performed irrespective of the canister load if it is determined at 412 that a leak test is desired. An example routine for running a leak test is described below with reference to FIG. 5.

Turning now to FIG. 5, it shows an example method 500 for performing a leak test of an EVAP system (e.g., EVAP system 251 described above in FIG. 2) and/or a fuel system (e.g., fuel system 218 described above in FIG. 2). Thus, method 500 may be executed as part of a subroutine of method 400 described above in FIG. 4 at step 416. The leak test may comprise powering on a leak test pump (e.g., vacuum pump 297 described above in FIGS. 2-3C) of a leak test control module (e.g., ELCM 295 described above in FIGS. 2-3C), to draw vacuum on the EVAP system and/or fuel system. In some examples, when hydrocarbon breakthrough from a fuel vapor storage canister (e.g., canister 222 described above in FIG. 2) is detected and/or is imminent, the leak test may be temporarily paused or cancelled, and an engine (e.g., engine 210 described above in FIG. 2) may be spun by a motor (e.g., motor 120 described above in FIG. 1B) to pull fuel vapors within the canister away from a fresh air end of the canister to reduce and/or prevent hydrocarbon emissions.

Method 500 begins at 502 which comprises estimating and/or measuring engine operating conditions in the same or similar manner to that described above in FIG. 4 at 402. Method 500 may then continue to 504 which comprises determining if a key-off event has occurred in the same or similar manner to that described above in FIG. 4 at 404. If a key-off event has not occurred and the vehicle is on, then method 500 may continue to 506 which comprises maintaining the leak test pump off and not running the leak test. Method 500 then returns.

However, if at 504 it is determined that a key-off event has occurred and the vehicle is off, then method 500 may continue from 504 to 508 which comprises determining if a leak test is desired in the same or similar manner to that described above in FIG. 4 at 412. Thus, in some examples, a leak test may only be performed when the vehicle is off. However, in other examples, the method 500 may not include 504, and may proceed directly from 502 to 508. Thus, in some examples, the leak test may be performed when the vehicle is on. If a leak test is not desired, then method 500 may continue from 508 to 506, the leak test may not be run, and the leak test pump may remain off. Method 500 then returns.

However, if at 508 it is determined that a leak test is desired, then method 500 continues from 508 to 509 which comprises running the leak test. As described above with reference to FIGS. 3A-3C, running the leak test may comprise powering on the leak test pump and running one or more of running a reference check routine and/or running a leak check routine. For example, the method 500 at 509 may comprise powering on the leak test pump and adjusting a COV (e.g., COV 315 described above in FIGS. 3A-3C) to a closed first position (e.g., closed first position 301 described above in FIG. 3A) to run a reference check. In particular, a controller (e.g., controller 212 described above in FIG. 2) may send signals to an actuator (e.g., solenoid 310 described above in FIGS. 3A-3C) of the COV to adjust the COV to the first position such that the leak test pump draws gasses from only a reference orifice (e.g., orifice 340 described above in FIGS. 3A-3C) of the leak test control module. The method 500 at 509 may additionally or alternatively comprise adjusting the COV to an open second position (e.g., second position 303 described above in FIG. 3B) to run a leak check. In particular the controller may send signals to the actuator of the COV to adjust the COV to the second position such that the leak test pump draws gasses from the canister. Thus, in the second position, the COV may couple the canister to the leak test pump around the orifice, such that gasses do not have to flow through the reference orifice to reach the pump from the canister. Said another way, adjusting the COV to the second position may bypass the reference orifice. Powering on the leak test pump may comprise increasing an amount of electrical power supplied to the leak test pump.

In some examples, the method 500 at 509 may additionally comprise opening a FTIV (e.g., FTIV 252 described above in FIG. 2) and/or opening a CVV (e.g., CVV 298 described above in FIG. 2). Thus, by opening the FTIV, the leak test pump may draw vacuum on a fuel tank (e.g., fuel tank 220 described above in FIG. 2) and the fuel system. Opening the CVV may permit gasses drawn out of the EVAP system and/or fuel system by the leak test pump to be emitted to the atmosphere after passing through the canister.

In some examples, the method may comprise running the reference check prior to running the leak check. Thus, in some examples the method may comprise powering on the leak test pump and adjusting the COV to the first position such that the pump draws vacuum on the reference orifice. The COV may be maintained in the first position until a pressure in the leak test control module reach a threshold pressure and/or reaches a steady state. Then, the COV may be adjusted to the second position, and pressure within the leak test control module may be monitored and compared to the pressure profile generated during the reference check while the COV was in the first position. However, in other examples, the method may comprise only running the leak check.

In yet further examples, running the leak test may comprise running the leak test with the FTIV open to evacuate the fuel system, and then running the leak test with FTIV closed to evacuate the EVAP system. In yet further examples, running the leak test may comprise running the leak test with FTIV closed to evacuate the EVAP system and then running the leak test with the FTIV open to evacuate the fuel system. In still further examples, running the leak test may comprise maintaining the FTIV closed during the entirety of the leak check portion of the leak test. In still further examples, running the leak test may comprise maintaining the FTIV open during the entirety of the leak check portion of the leak test.

While running the leak test at 509, method may continue to 514 which comprises determining if hydrocarbon breakthrough is imminent at a fresh air end (e.g., fresh air first end 224) of the canister. In some examples, the method 500 at 514 may additionally or alternatively comprise determining if hydrocarbon breakthrough is occurring at the fresh air end of the canister. Due to the negative pressure applied to canister by the leak test pump during the leak test, hydrocarbons in the canister may be pulled towards the leak test pump, and in some examples may escape from the canister and reach the atmosphere.

Hydrocarbon breakthrough from the fresh air end may be detected based on outputs from a temperature sensor positioned at or proximate the fresh air end of the canister (e.g., temperature sensor 232 described above in FIG. 2). As described above in FIG. 2, a temperature of the canister may increase as it adsorbs hydrocarbons. Thus, hydrocarbon increases in the canister may be inferred based on temperature changes within the canister. If the temperature at the fresh air end of the canister increases above a threshold and/or increases at more than a threshold rate, then it may be determined that hydrocarbon breakthrough from the canister is imminent and/or is occurring. For example, if the temperature at the fresh air end of the canister increases by more than a threshold over a threshold duration, then it may be determined that hydrocarbon breakthrough from the canister is imminent and/or is occurring. Thus, hydrocarbon breakthrough from the fresh air end may be detected based on temperature changes at the fresh air end of the canister. Hydrocarbon breakthrough may be determined to be occurring when the temperature stops increasing and starts to decrease at the fresh air first end (e.g., an inflection point is reached).

Thus, an amount of hydrocarbons and/or a concentration of hydrocarbons at the fresh air first end of the canister may be estimated based on the temperature at the first end of the canister, where the amount and/or concentration of hydrocarbons increases for increases in the temperature. Hydrocarbon breakthrough may be determined to be imminent when the amount and/or concentration of hydrocarbons at the first end increases above first threshold.

If hydrocarbon breakthrough is not imminent, then method 500 may proceed from 514 to 516 which comprises continuing to run the leak test. Thus, the method 500 may comprise continuously monitoring fuel vapors levels and/or canister temperature at the fresh air end of the canister during the leak test to detect if hydrocarbon breakthrough from the fresh air end of the canister is imminent and/or occurring. Method 500 then continues from 516 to 518 which comprises completing the leak test and powering off the leak test pump. Thus, if hydrocarbon breakthrough is not detected and/or is not imminent during the leak test, then the leak test may be completed and subsequently the leak test pump may be powered off.

After completing the leak test, method 500 continues from 518 to 520 which comprises determining if the leak test passed. As described above with reference to FIGS. 2-3C, determining whether the leak test passed may comprise comparing a pressure profile in the leak test control module generated during the leak check portion of the leak test, to a pressure profile generated during the reference check portion of the leak test. Thus, the pressure in the leak test control module may be estimated based on outputs from a pressure sensor (e.g., pressure sensor 296 described above in FIGS. 3A-3C) coupled within the leak test control module. The pressure in the leak test control module may be monitored during the leak check portion of the leak test and compared to the pressure profile in the leak check module generated during the reference check portion of the leak test.

The leak test may pass when the pressure profile generated during the leak check portion of the leak test varies from the profile generated during the reference check portion of the leak test by less than a threshold. Thus, if the difference or deviation between the pressure profiles from the leak check and the reference check is less than a threshold, then the leak check may pass. Similarly, if the difference or deviation between the pressure profiles from the leak check and the reference check is greater than the threshold, then the leak check may not pass. Thus, in some examples, a difference in an amount of time required for leak test pump to reduce the pressure in the leak test control module to a threshold pressure may be compared between the reference check and the leak check. If the leak test pump takes longer than a threshold duration to bring the pressure in the leak test pump down to the threshold during the leak check as compared to the reference check, then the leak test may fail. In other examples, the leak test may fail when the leak test pump fails to reduce the pressure in the leak test control module to below a threshold pressure.

If it is determined that the leak test passed at 520, then method 500 may continue from 520 to 522 which comprises maintaining the leak test pump off until a subsequent leak test. Method 500 then returns. However, if at 520 it is determined that the leak test failed, then method 500 may continue from 520 to 524 which may comprise alerting a vehicle operator (e.g., vehicle operator 102 described above in FIG. 1B). For example, the method 500 at 524 may comprise generating an alert indicating that there is a leak in the EVAP system and/or fuel system. The alert may be displayed to the vehicle operator via a display screen (e.g., message center 196 described above in FIG. 1B). Method 500 then returns.

Returning to 514, if it is determined that hydrocarbon breakthrough from the fresh air first end of the canister is imminent, then method 500 may continue from 514 to 526 which comprises cancelling the leak test, turning off the leak test pump, and adjusting the COV to the closed first position. Thus, in some examples, the leak test may be cancelled when hydrocarbon breakthrough is imminent, prior to hydrocarbon breakthrough. Thus, the leak test may be cancelled while the temperature at the fresh air end of the canister is still increasing. In yet further examples, the leak test may be cancelled when the fresh air end of the canister has become substantially full or saturated (e.g., when the temperature at the fresh air end of the canister stops increasing and stabilizes). In yet further examples, the leak test may be cancelled when hydrocarbon breakthrough to the atmosphere is detected, such as when the temperature at the fresh air end begins to decrease (e.g., when an inflection point has been reached). Thus, the leak test may be cancelled when the hydrocarbon concentration at the first end of the canister increases above the first threshold.

Turning off the leak test pump may comprise reducing an amount of electrical power supplied to the leak test pump to approximately zero. Thus, current and/or voltage supplied to the leak test pump may be reduced to zero. In some examples, the method 500 at 526 may additionally comprise closing the FTIV. In yet further examples, the method 500 at 526 may additionally comprise closing the CVV to reduce and/or prevent hydrocarbon escape to the atmosphere.

After cancelling the leak test at 526, method 500 may continue to 528 which comprises opening a CPV (e.g., CPV 261 described above in FIG. 2) and spinning the engine. The engine may be spun by the motor. Thus, the controller may send signals to the motor to spin the engine. The engine may be spun in some examples for a threshold duration. In other examples, the engine may be spun responsive to a shift in fuel vapor distribution within the canister. Opening the CPV may comprise sending signals from the controller to an actuator of the CPV to adjust the CPV to a more open position. By opening the CPV and spinning the engine, negative pressure generated by the spinning engine may be applied to the canister. In this way, hydrocarbons within the canister may be pulled to a second end of the canister opposite the fresh air first end of the canister (e.g., end 226 described above in FIG. 2) due the vacuum generated by the spinning engine. Thus, the hydrocarbons within the canister may be pulled towards the engine, and away from the atmosphere.

In some examples, the method 500 at 528 may comprise spinning the engine unfueled. Thus, fuel may not be injected into the engine, and fuel vapors from the canister may not reach the engine. Thus, the canister may not be purged and an amount of fuel vapors stored in the canister may not be reduced while spinning the engine and opening the CPV. Said another way, hydrocarbons in the canister may be not be desorbed from the canister while spinning the engine unfueled, and the amount of hydrocarbons in the canister may remain substantially constant while spinning the engine unfueled. Thus, the spinning the engine may be terminated and/or the CPV may be closed before hydrocarbons in the canister are desorbed and/or purged to the engine.

In this way, spinning the engine unfueled may comprise only pumping air from the atmosphere admitted through an intake passage (e.g., intake passage 242 described above in FIG. 2) through the engine cylinders (e.g., cylinders 230 described above in FIG. 2). However, in other examples, fuel may be injected into the cylinder while spinning the engine. Method 500 at 528 may additionally comprise opening the CVV. If the CVV is already open, then the CVV may be maintained in an open position at 528. However, in other examples, the CVV may be closed at 528. Opening the CVV at 528 may facilitate the movement of fuel vapors within the canister away from the fresh air first end of the canister.

While spinning the engine at 528, the method 500 may continue to 530 which comprises determining if hydrocarbon breakthrough is imminent at the second end of the canister. As described above with reference to detecting hydrocarbon breakthrough at the first end of the canister, determining if hydrocarbon breakthrough is imminent at the second end may be determined based on outputs from a second temperature sensor (e.g., second temperature sensor 236 described above in FIG. 2) positioned at or near the second end of the canister. Thus, based on temperature changes at the second end of the canister, hydrocarbon breakthrough may be detected. Thus, hydrocarbon breakthrough may be determined to be imminent at the second end of the canister when the temperature at the second end increases above a threshold and/or increases at more than a threshold rate.

Thus, an amount of hydrocarbons and/or a concentration of hydrocarbons at the second end of the canister may be estimated based on the temperature at the second end of the canister, where the amount and/or concentration of hydrocarbons increases for increases in the temperature. Hydrocarbon breakthrough may be determined to be imminent when the amount and/or concentration of hydrocarbons at the second end increases above second threshold.

In yet another example, the method 500 at 530 may comprise determining if the hydrocarbon concentration and/or or amount at the first end of the canister has decreased below a third threshold. Thus, since the amount of hydrocarbons stored in the canister may remain approximately constant while spinning the engine, an amount of hydrocarbons at the second end may be inferred based on changes in the hydrocarbon levels at the first end. In this way, hydrocarbon breakthrough from the second end may be determined to be imminent when the concentration and/or amount of hydrocarbons at the first end decreases by more than a threshold amount.

If hydrocarbon breakthrough is not imminent, then method 500 may continue from 530 to 529 which comprises maintaining the CPV open and continuing to spin the engine. Method 500 may then continue from 529 to 530 and may continue to detect if hydrocarbon breakthrough is imminent at the second end of the canister. In this way, the engine may continue to be spun by the motor and the CPV may be maintained open until hydrocarbon breakthrough is determined to be imminent at the second end of the canister. Thus, the engine may continue to spin and the CPV may be maintained open until the fuel vapor levels at the second end of the canister reach a threshold.

When hydrocarbon breakthrough is imminent at the second end of the canister, method 500 may continue from 530 to 532 which comprises closing the CPV and stopping spinning the engine. Thus, in response to the fuel vapor levels increasing by more than a threshold amount and/or increasing above a threshold and/or increasing by more than a threshold rate, the controller may send signals to the motor to stop spinning the engine and further to an actuator of the CPV to close the CPV. In this way, vacuum applied to the canister by the engine may be reduced and/or stopped at 532.

Thus, in some examples, the CPV may be closed, and/or cranking of the engine may be terminated when hydrocarbon breakthrough to the intake of the engine is imminent, prior to hydrocarbon breakthrough at the second end of the canister. Thus, the spinning of the engine unfueled may be cancelled while the temperature at the second end of the canister is still increasing. In other examples, the CPV may be closed and/or cranking of the engine may be terminated when the second end of the canister has become substantially full or saturated (e.g., when the temperature at the second end of the canister stops increasing and stabilizes). In yet further examples, the cranking of the engine may be terminated and/or the CPV may be closed when hydrocarbon breakthrough to the engine intake is detected, such as when the temperature at the second end begins to decrease (e.g., when an inflection point has been reached).

Method 500 may then continue from 532 to 534 and may power on the leak test pump, and adjust the COV to the open second position. Thus, the leak test may be resumed at 534. In this way, the leak test may be resumed after spinning the engine and pulling fuel vapors away from the fresh air first end of the canister. Method 500 may then continue from 534 to 516 and may continue to run the leak test. However, in other examples method 500 may return after spinning the engine and may not resume the leak test.

Continuing to FIG. 6, it shows an example graph 600 depicting adjustments to an ELCM pump (e.g., vacuum pump 297 described above in FIGS. 2-3C) under varying vehicle operating conditions. Graph 600 includes plot 602 indicating a vehicle-on status over time, plot 604 indicating changes in pressure of a fuel tank (e.g., fuel tank 220 described above in FIG. 2), and plot 606, indicating changes in the position of a fuel tank isolation valve (e.g., FTIV 252 described above in FIG. 2) over time. Graph 600 further includes plot 608 which depicts changes in the position of an ELCM COV (e.g., COV 315 described above in FIGS. 3A-3C). Plot 610 depicts changes in an operation status of an ELCM pump (e.g., vacuum pump 297 described above in FIGS. 2-3C), plot 612 depicts changes in the position of a CPV (e.g., CPV 261 described above in FIG. 2), plot 614 depicts changes in the speed of an engine (e.g., engine 210 described above in FIG. 2), plot 618 depicts changes in fuel vapor levels at a fresh air first end (e.g., first end 224 described above in FIG. 2) of a fuel vapor storage canister (e.g., canister 222 described above in FIG. 2), and plot 616 depicts changes in fuel vapor level at a second end (e.g., second end 226 described above in FIG. 2) of the canister.

The fuel tank pressure may be estimated based on outputs from a fuel tank pressure sensor (e.g., FTPT 291 described above in FIG. 2). Further, the fuel vapor levels (e.g., canister loading) at the first and second ends of the canister may be estimated by respective temperature sensors (e.g., temperature sensors 232 and 236 described above in FIG. 2) as discussed above with reference to FIGS. 2 and 5.

Starting before $t_0$, the vehicle is on (plot 502) and the engine is spinning (plot 614). The fuel tank pressure (plot 604) remains below a threshold 605, and thus the FTIV may remain closed (plot 606). However, the canister load at the first end (plot 618) and second end (plot 616) may be greater than first and second thresholds 617 and 619, respectively. Thus, the CPV may be open (plot 612) before $t_0$ to purge fuel vapors from the canister to the engine. The ELCM pump may remain off (plot 610), and the COV may remain in the closed first position (e.g., first position 301 described above in FIGS. 3A and 3C).

At time $t_0$, the canister load may reach sufficiently low levels such that the CPV is closed, and the canister may stop being purged. The vehicle may remain on, the engine may continue to spin, however engine speed may be decreasing. The FTIV remains closed, the ELCM COV remains in the closed first position, the ELCM pump remains off, and the fuel tank pressure remains relatively the same.

Between $t_0$ and $t_1$, the engine slows down. At $t_1$, the engine stops, and the vehicle is powered off. The FTIV remains closed, the ELCM COV remains in the closed first position, the ELCM pump remains off, and the fuel tank pressure remains relatively the same. Further, the CPV remains closed, and the canister load at the first and second end remain relatively the same.

At $t_2$, a refueling event may begin. As fuel is added to the fuel tank at $t_2$, the fuel tank pressure may begin to increase. The FTIV remains closed, the ELCM COV remains in the closed first position, and the ELCM pump remains off. Further, the CPV remains closed, and the canister load at the first and second end remain relatively the same. The engine may not be spinning and the vehicle may remain off.

Between $t_2$ and $t_3$, the fuel tank pressure continues to increase as fuel is added to the tank. At $t_3$ the fuel tank pressure may increase above the threshold 605. In response to the fuel tank pressure increase above the threshold at $t_3$, the FTIV may be opened at $t_3$ to route fuel vapors from the fuel tank to the fuel vapor storage canister. As such, the canister load at the first and of the canister and/or the second end of the canister may begin to increase as a result of the influx of fuel vapors from the fuel tank. The ELCM COV remains in the closed first position, and the ELCM pump remains off. Further, the CPV remains closed, the engine may not be spinning and the vehicle may remain off.

Between $t_3$ and $t_4$, the fuel tank pressure may decrease due to the open FTIV. Further, the refueling event may end. The ELCM COV remains in the closed first position, and the ELCM pump remains off. Further, the CPV remains closed, and the canister load at the first and second end may continue to increase due to the open FTIV. The engine may not be spinning and the vehicle may remain off.

At $t_4$, the fuel tank pressure may be reduced to sufficiently low levels and the FTIV may be closed. Between $t_4$ and $t_5$, the ELCM COV remains in the closed first position, and the ELCM pump remains off. Further, the CPV remains closed, and the canister load at the first and second end remain relatively the same. The engine may not be spinning and the vehicle may remain off.

At $t_5$, a leak test may be desired. As such, the ELCM pump may be powered on, and the ELCM COV may be held in the closed first position to run a reference check portion of the leak test between $t_5$ and $t_6$. Further, the CPV remains closed, and the canister load at the first and second end remain relatively the same. The engine may not be spinning and the vehicle may remain off. The FTIV may remain closed.

At $t_6$, the reference check portion of the leak test may terminate, and the leak check portion of the test may commence. Thus, the COV may be adjusted to the open position, and the ELCM pump may remain on. Due to the opening of the COV at $t_6$, the fuel vapor levels at the first end of the canister may begin to increase and the fuel vapor level at the second end of the canister may begin to decrease. Thus, the fuel vapors may be pulled towards the ELCM pump, and away from the second end of the canister due to the opening of the COV. Opening of the COV refers to movement of the COV towards the second position and away from the first position. The FTIV may be opened to draw vacuum on the fuel tank. Further, the CPV remains closed, the engine may not be spinning and the vehicle may remain off. Fuel tank pressure may remain approximately the same.

Between $t_6$ and $t_7$, fuel vapor levels at the first end continue to increase, and fuel vapor levels at the second end continue to decrease due to the ELCM pump continuing to draw vacuum on the canister. The ELCM COV may remain in the open position. FTIV may remain open and the fuel tank pressure may remain approximately the same. The CPV remains closed, the engine and vehicle may remain off.

At $t_7$, the fuel vapor levels at the first end of the canister may increase above the threshold 619, and in response the ELCM pump may be powered off, the ELCM COV may be adjusted to the closed position, the FTIV may be adjusted to the closed position, and the engine may be spun. Thus, the motor may spin the engine without fuel starting at $t_7$. The CPV may be opened at $t_7$ such that vacuum generated by the spinning engine may be applied to the canister. Thus, the engine speed may begin to increase at $t_7$. The spinning engine may pull fuel vapors within the canister in a direction opposite of the ELCM pump. Thus, due to the spinning engine and opening of the CPV, fuel vapors within the canister may begin to shift away from the first end and towards the second end at $t_7$. Fuel tank pressure may remain approximately constant and the vehicle may remain off.

Between $t_7$ and $t_8$, the engine speed may increase, and the amount of fuel vapors at the second end of the canister may continue to increase as they are pulled away from the first end. Thus, the amount of fuel vapors at the first end may continue to decrease. The CPV may remain open, the ELCM pump may remain off, the ELCM may remain in the closed position, the FTIV may remain closed, and the fuel tank pressure may remain approximately the same, and the vehicle may remain off. Fuel vapors may not exiting the canister. Thus, the fuel vapor level within the entire canister may remain approximately constant between $t_7$ and $t_8$, however, the distribution of fuel vapors within the canister may shift such that the concentration at the second end increases and decreases at the first end. Thus, fuel vapors may not be purged to the engine, and hydrocarbons may not be desorbed from the canister to the engine between $t_7$ and $t_8$.

At $t_7$, the fuel vapor levels at the second end of the canister may increase above the threshold 617, and in response the engine may stop being spun by the motor, and thus engine speed may decrease to approximately zero. The CPV may be closed in response to the fuel vapor level at the second end of the canister increasing above the threshold 617, to stop applying vacuum to the canister. In this way, fuel vapor levels at the second end of the canister may stop increasing after $t_8$. Thus, fuel vapors may be pulled away from the first end of the canister, without desorbing the fuel vapors from the canister and purging them to the engine. Thus, the CPV may be closed prior to vapors being purged to the engine. Further, in response to the closing of the CPV, the ELCM pump may be powered on again, the FTIV may be opened, and the ELCM COV may be adjusted to the open position to resume to leak test. The fuel tank pressure may remain approximately the same as before $t_8$, and the vehicle may remain off.

Between $t_8$ and $t_9$, the leak test may resume and continue. Thus, the ELCM pump may remain on, the FTIV may remain open, and the COV may remain in the open position. Fuel tank pressure may remain approximately the same, and the vehicle may remain off. Further, the CPV may remain closed, and the engine may remain off. Due to the vacuum generated by the ELCM pump, the fuel vapor levels at the second end of the canister may decrease, and the fuel vapor levels at the first end of the canister may increase. However, the fuel vapors levels at the first end of the canister may not increase above the threshold 618. As such, the leak may be completed at $t_9$.

Upon completion of the leak test at $t_9$, the ELCM pump may be powered off, and the ELCM COV may be adjusted to the closed position. Fuel tank pressure may remain approximately constant after $t_9$, the vehicle and engine may remain off, and the FTIV may be closed. Canister loading may remain approximately constant at the first and second ends and the CPV may remain closed.

In this way, a technical effect of reducing emissions is achieved by spinning an engine unfueled to pull hydrocarbons away from a fresh air end of a fuel vapor canister. In particular, hydrocarbon emissions during an EVAP leak test may be reduced by pausing the leak test and spinning the engine unfueled when hydrocarbon levels at the fresh air end of the canister increase above a threshold. By spinning the engine and opening the CPV, hydrocarbons in the canister may be redistributed, such that they are shifted away from the fresh air end and towards a purge end more proximate the engine. In this way, hydrocarbon emissions to the atmosphere may be reduced and/or prevented during subsequent leak tests.

Another technical effect of reducing a cost of the EVAP system is achieved by spinning the engine unfueled as compared to approaches that may operate the vacuum pump in a reverse direction to push the hydrocarbons in the canister away from the fresh air end. In particular, additional electrical components such as an H-bridge may be required to run the vacuum pump in two, opposite directions. Such additional electrical components may increase the cost of the EVAP system. Further, the efficiency of the pump may be lower in the reverse direction, leading to increased energy consumption. By cranking the engine with a motor, and utilizing the vacuum generated by the spinning engine to pull fuel vapors away from the fresh air end of the canister, the cost, and energy consumption of the EVAP system may be reduced relative to approaches that power the vacuum pump in a reverse direction to push fuel vapors away from the fresh air end of the canister. Thus, the motor used to crank the engine may be more energy efficient than a motor of the vacuum pump run in reverse. That is, running the vehicle motor in a forward direction to spin the engine may consume less energy than the vacuum pump run in a reverse direction.

In one representation, a method may comprise, spinning an engine unfueled responsive to a hydrocarbon concentration at a fresh air end of a fuel vapor canister increasing above a first threshold, to pull hydrocarbons away from the fresh air end of the fuel vapor canister. The hydrocarbon concentration at the fresh air end of the fuel vapor canister may be determined based on outputs from a temperature sensor positioned at the fresh air end of the fuel vapor canister. Any one or more combinations of the above methods may further comprise opening a canister purge valve responsive to the hydrocarbon concentration at the fresh air end of the fuel vapor canister increasing above the first threshold. In any one or more combinations of the above methods, the spinning the engine unfueled may comprise cranking the engine with a motor and flowing only air through one or more cylinders of the engine. Any one or more combinations of the above methods may further comprise, closing a canister purge valve and stopping spinning the engine responsive to a hydrocarbon concentration at a purge end of the fuel vapor canister increasing above a second threshold such that hydrocarbons in the canister are not released to the engine, the purge end opposite the fresh air end. In any one or more combinations of the above methods the hydrocarbon concentration at the purge end of the fuel vapor canister may be determined based on outputs from a second temperature sensor positioned at the purge end of the fuel vapor canister. Any one or more combinations of the above methods may further comprise, closing a canister purge valve and stopping spinning the engine responsive to the hydrocarbon concentration at the fresh air end of the fuel vapor canister decreasing below a third threshold. Any one or more combinations of the above methods may further comprise, closing a canister vent valve positioned between the canister and atmosphere, responsive to the hydrocarbon concentration at the fresh air end of the fuel vapor canister increasing above the first threshold. Any one or more combinations of the above methods may further comprise, powering off an evaporative emissions control (EVAP) leak test pump responsive to the hydrocarbon concentration at the fresh air end of the fuel vapor canister increasing above the first threshold.

In another representation, a method may comprise running a leak test for an evaporative emissions control (EVAP) system, and responsive to determining that hydrocarbon breakthrough from a vent side of a fuel vapor canister of the EVAP system is imminent: stopping the leak test, opening a canister purge valve to fluidically couple the canister to an intake of an engine, and spinning the engine without fuel. In some examples, running the leak test may comprise powering on a vacuum pump positioned between the canister and atmosphere to evacuate the EVAP system to the atmosphere, and wherein stopping the leak test comprises powering off the vacuum pump. In any one or more combinations of the above methods hydrocarbon breakthrough from the vent side of the fuel vapor canister may be determined to be imminent when a temperature at the vent side of the fuel vapor canister increases above a threshold. Any one or more combinations of the above methods may further comprise stopping spinning the engine and closing the canister purge valve responsive to determining that hydrocarbon release from a purge side of the fuel vapor canister to the engine is imminent. In any one or more combinations of the above methods hydrocarbon release from the purge side of the fuel vapor canister may be determined to be imminent when a temperature at the purge side of the fuel vapor canister increases above a threshold. Any one or more combinations of the above methods may further comprise, resuming the leak test and powering back on the vacuum pump after stopping spinning the engine and closing the canister purge valve.

In yet a further representation, a vehicle system may comprise an engine including one or more engine cylinders, an evaporative emissions control (EVAP) system including a fuel vapor canister, a fuel system including a fuel tank, an evaporative leak check module (ELCM) including a vacuum pump for detecting leaks of one or more of the EVAP system and fuel system, and a controller with computer readable instructions stored in non-transitory memory for redistributing hydrocarbons within the canister by spinning the engine unfueled in response to hydrocarbon levels at a fresh air end of the canister increasing above a threshold. In some examples, the vehicle system may further comprise a canister purge valve positioned between the canister and the engine, and where the controller further may include computer readable instructions stored in non-transitory memory for opening the canister purge valve while spinning the engine to fluidically couple the canister to the engine. Any one or more combinations of the above system may further comprise a first temperature sensor positioned at the fresh air end of the canister for estimating hydrocarbon levels at the fresh air end of the canister, and a second temperature sensor positioned at a purge end of the canister for estimating hydrocarbon levels at the purge of the canister, the purge end opposite the fresh air end and positioned more proximate that engine than the fresh air end. In any one or more combinations of the above systems, spinning the engine may apply negative pressure to the canister in a direction opposite of the vacuum pump when the vacuum pump is powered on. In any one or more combinations of the above systems, the vacuum pump may be a unidirectional pump that draws gasses out of the canister and pushes them towards the atmosphere.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
running a leak test for an evaporative emissions control (EVAP) system by applying vacuum to a vent side of a fuel vapor canister to flow vapor in a first direction; and
performing the following steps responsive to a temperature at the vent side exceeding a temperature threshold and/or a concentration at the vent side exceeding a concentration threshold:
stopping the leak test;
opening a canister purge valve on a second side of the fuel vapor canister; and
spinning an engine without fuel to apply vacuum to the second side of the fuel vapor canister and flow vapor in a second direction.

2. The method of claim 1, further comprising opening the canister purge valve responsive to a hydrocarbon concentration at the vent side of the fuel vapor canister increasing above a first threshold.

3. The method of claim 1, wherein hydrocarbon escape from the vent side of the fuel vapor canister is determined to be imminent when a temperature at the vent side of the fuel vapor canister increases above a temperature threshold.

4. The method of claim 1, wherein a vacuum pump applies the vacuum to the vent side of the fuel vapor canister.

5. The method of claim 4, wherein the engine spinning without fuel applies vacuum in an opposite direction of the vacuum pump.

6. The method of claim 5, wherein hydrocarbon breakthrough is determined using a temperature of the fuel vapor canister.

7. The method of claim 6, wherein the first direction extends through the fuel vapor canister towards the vent side of the fuel vapor canister, and the second direction is opposite of the first direction.

8. A method comprising:
running a leak test by applying vacuum to an atmosphere side of a fuel vapor canister to flow vapor in a first direction; and
performing the following steps responsive to a temperature at the vent side exceeding a temperature threshold and/or a concentration at the vent side exceeding a concentration threshold:

stopping the leak test; and
spinning an engine without fuel to apply vacuum to a second side of the fuel vapor canister and flow vapor in a second direction opposite the first direction and atmosphere.

9. The method of claim 8, further comprising closing a canister vent valve positioned between the fuel vapor canister and atmosphere, responsive to the hydrocarbon concentration at the atmosphere side of the fuel vapor canister increasing above a first threshold.

10. The method of claim 8, wherein the vacuum applied during the leak test is applied by a leak test pump; and the method further comprising powering off the leak test pump responsive to a hydrocarbon concentration at the atmosphere side of the fuel vapor canister increasing above a first threshold.

11. The method of claim 10, wherein the leak test pump is positioned between the fuel vapor canister and atmosphere to evacuate an evaporative emissions control (EVAP) system including the fuel vapor canister to atmosphere, and wherein stopping the leak test comprises powering off a vacuum pump.

12. The method of claim 8, further comprising closing a canister purge valve and stopping spinning the engine responsive to a hydrocarbon concentration at the second side of the fuel vapor canister increasing above a second threshold such that hydrocarbons in the fuel vapor canister are not released to the engine, the second side opposite the atmosphere side.

13. The method of claim 12, wherein a hydrocarbon concentration at the second side of the fuel vapor canister is determined based on outputs from a second temperature sensor positioned at the second side of the fuel vapor canister and hydrocarbon escape from the atmosphere side of the fuel vapor canister is determined to be imminent when the hydrocarbon concentration at the atmosphere side of the fuel vapor canister increases above a first threshold.

14. The method of claim 13, further comprising closing the canister purge valve and stopping spinning the engine responsive to the hydrocarbon concentration at the atmosphere side of the fuel vapor canister decreasing below a third threshold.

15. A method comprising:
running a leak test by applying vacuum to a first side of a fuel vapor canister connected to an outlet to atmosphere; and
performing the following steps responsive to a temperature at the vent side exceeding a temperature threshold and/or a concentration at the vent side exceeding a concentration threshold:
stopping the leak test;
opening a canister purge valve on a second side of the fuel vapor canister; and
applying vacuum to the second side of the fuel vapor canister by spinning an engine without fuel to flow hydrocarbons in the fuel vapor canister in a second direction away from the outlet to atmosphere.

16. The method of claim 15, further comprising resuming the leak test and powering back on a vacuum pump after stopping spinning the engine and closing the canister purge valve.

17. The method of claim 15, determining hydrocarbon concentration at the first side of the fuel vapor canister using a first temperature sensor and determining hydrocarbon concentration at the second side of the fuel vapor canister using a second temperature sensor, the second side opposite the first side and positioned more proximate the engine than first.

18. The method of claim 15, wherein hydrocarbon escape is determined based on a hydrocarbon concentration at the first side and the method further comprising stopping spinning the engine and closing the canister purge valve responsive to determining that hydrocarbon escape from the second side of the fuel vapor canister to the engine is imminent.

19. The method of claim 18, wherein the hydrocarbon concentration at the second side of the fuel vapor canister is determined based on outputs from a second temperature sensor positioned at the second side of the fuel vapor canister.

20. The method of claim 19, wherein hydrocarbon release from the second side of the fuel vapor canister is determined to be imminent when a temperature at the second side of the fuel vapor canister increases above a temperature threshold.

* * * * *